(12) United States Patent
St. Amand et al.

(10) Patent No.: US 6,556,046 B1
(45) Date of Patent: Apr. 29, 2003

(54) FUNCTIONAL PATHWAY CONFIGURATION AT A SYSTEM/IC INTERFACE

(75) Inventors: Roger D. St. Amand, Tempe, AZ (US); Steven R. Bible, Chandler, AZ (US); Richard J. Fisher, Glendale, AZ (US); Johannes A. Van Niekerk, Tempe, AZ (US); Farron L. Dacus, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 60 days.

(21) Appl. No.: 09/953,059

(22) Filed: Sep. 14, 2001

Related U.S. Application Data

(63) Continuation-in-part of application No. 09/907,205, filed on Jul. 17, 2001.

(51) Int. Cl.[7] .......................................... H03K 19/0175
(52) U.S. Cl. ........................................ 326/63; 327/333
(58) Field of Search ................................ 257/678, 690, 257/691, 692, 693, 694, 696, 697, 698; 326/62, 63; 327/333

(56) References Cited

U.S. PATENT DOCUMENTS

| 4,511,990 A | * | 4/1985 | Hagiwara et al. ........... 364/748 |
| 5,007,020 A | * | 4/1991 | Inskeep ...................... 364/900 |
| 5,012,441 A | * | 4/1991 | Retter ........................ 364/900 |
| 6,058,409 A | * | 5/2000 | Kozaki et al. ............... 708/409 |
| 6,061,780 A | * | 5/2000 | Shippy et al. ............... 712/204 |

* cited by examiner

Primary Examiner—Olik Chaudhuri
Assistant Examiner—Dana Farahani
(74) Attorney, Agent, or Firm—Baker Botts L.L.P.

(57) ABSTRACT

The present invention relates generally to functional pathway configurations at the interfaces between integrated circuits (ICs) and the circuit assemblies with which the ICs communicate. More particularly, the present invention relates generally to the functional pathway configuration at the interface between a digital device and a radio frequency device (wireless RF digital device), and the circuitry of a system including the packaged devices. Even more particularly, the present invention relates to a wireless radio frequency digital device functional pathway configuration for the interface between the wireless radio frequency digital device and a system in which the wireless radio frequency digital device is embedded.

19 Claims, 2 Drawing Sheets

FUNCTIONAL PATHWAY CONFIGURATION AT A SYSTEM/IC INTERFACE

RELATED PATENT APPLICATIONS

This application is a continuation-in-part of U.S. patent application Ser. No. 09/907,205, filed Jul. 17, 2001, entitled, "Functional Pathway Configuration at a System/IC Interface," by Roger D. St. Amand, Steven R. Bible, Richard J. Fisher, Johannes A. van Niekerk and Farron L. Dacus, and which is still pending.

FIELD OF THE INVENTION

The present invention relates generally to functional pathway configurations at the interfaces between integrated circuit (IC) packages and the circuit assemblies with which the IC packages communicate. More particularly, the present invention relates generally to the functional pathway configuration at the interface between one or more semiconductor integrated circuit dice, including an IC package capable of wireless control and/or status functionality in combination with a digital device adapted for wireless radio frequency (RF) functionality (hereinafter "wireless RF digital device") and the circuitry of a system comprising the wireless RF digital device in the IC package. Even more particularly, the present invention relates to an 18 or 20 pin functional pathway configuration for the interface between the wireless RF digital device and the system in which it is embedded. Advantageously, the wireless RF digital system comprises a digital device, e.g., microcontroller, microprocessor, programmable logic array (PLA), application specific integrated circuit (ASIC), digital state machine; digital code hopping encoder, digital code hopping decoder, digital code hopping encoder-decoder, and a radio frequency device, e.g., receiver, transmitter, or transceiver.

BACKGROUND OF THE INVENTION

The electronics industry is generally divided into two main segments: application products companies and semiconductor companies. The application products companies segment includes the companies that design, manufacture, and sell the wide variety of semiconductor-based goods. The semiconductor companies segment includes integrated circuit (IC) design companies (e.g., fabless companies which may design and/or sell semiconductor chips), foundries (e.g., companies that manufacture chips for others), and partially or fully integrated companies that may design, manufacture, package and/or market chips to application products companies.

There is a large range of semiconductor-based goods available across a broad spectrum of applications, e.g., goods which include one or more semiconductor devices, in applications ranging from manufactured printed circuit boards to consumer electronic devices (stereos, computers, toasters, microwave ovens, etc.) and automobiles (which, for example, include semiconductor devices in fuel injection, anti-lock brake, power windows and other on-board systems). Thus, as one might imagine, there also are a wide variety of semiconductor devices available to meet the various requirements of such products and applications.

Wireless radio frequency (RF) digital devices are replacing wired digital devices requiring interconnections to control and monitoring systems because the wireless RF digital devices are smaller, are controllable in remote locations not feasible for installation of wiring, and are becoming lower in cost. The wireless RF digital device is intended for use in the most compact, low cost class of wireless equipment such as control and security, telemetry, and R.F. automatic identification. Example applications include, but are not limited to, garage door openers, vehicle keyless entry systems, security sensors, process monitoring and control systems, inventory tracking and the like.

Typically, semiconductor integrated circuit companies who offer wireless RF digital devices provide these wireless RF digital devices with a set of features and capabilities appropriate for a particular product or application. Thus, these wireless RF digital devices may have a broad range of features and capabilities, and semiconductor companies typically tend to offer their customers a wide range of products incorporating wireless RF digital devices to meet their customers' needs. For example, a semiconductor company may offer a family of products including a feature-rich "high-end" product (e.g., for automobile applications) and one or more "low-end" products including fewer features (e.g., for household appliance applications).

But while an end-user consumer, concerned only with whether a product works, might be indifferent as to the integrated circuit wireless RF digital device included in a product, the product designer and manufacturer certainly are not. Product companies generally will expend great efforts to ensure that their products work properly and that consumers receive value and remain satisfied. Thus, product companies tend to select integrated circuit wireless RF digital devices for use in an application based on their features and capabilities, not to mention costs and other factors.

In view of such circumstances, there tends to be vigorous competition amongst semiconductor companies for integrated circuit wireless RF digital device "design wins." In other words, at the design stage, when a products company is designing a product for a given application, semiconductor companies compete for having their wireless RF digital devices included in the product. Once a product company establishes a design and sets the functional pathway configuration for the interface between a wireless RF digital device and the system in which it is embedded, the product company is less likely to change the configuration to accommodate another integrated wireless RF digital device having a different functional pathway configuration. Such configuration changes typically result in increased costs for the product company due to the system having to be re-designed in which the integrated circuit wireless RF digital device is embedded.

While there are a number of factors involved in any decision to award a design win, one such factor comprises a semiconductor company's product "roadmap." Over time, end-user consumers generally tend to favor future generation consumer products having increased features at lower costs. Accordingly, product companies evaluating integrated circuit wireless RF digital products of two or more semiconductor companies today will consider whether the particular solutions being offered now will allow them to migrate easily from a basic first generation design to an enhanced future generation design having increased capabilities and features. Such migration—without the products company incurring extensive system re-design costs—in general is necessary if the products company is to offer the future generation products that consumers typically demand.

A standard functional pathway configuration also significantly lowers testing costs by allowing reuse of test boards and software.

Accordingly, there remains a need for a simple and convenient functional pathway configuration for the interface between an integrated circuit wireless RF digital device and the system in which the integrated circuit wireless RF digital device is embedded, e.g., that tends to promote increased performance with lower costs.

SUMMARY OF THE INVENTION

The present invention may address one or more of the problems set forth above. Certain possible aspects of the present invention are set forth below as examples. It should be understood that such aspects are presented simply to provide the reader with a brief summary of certain forms the invention might take, and that these aspects are not intended to limit the scope of the invention. Indeed, the invention may encompass a variety of aspects that may not be set forth below.

In one embodiment of the present invention, a functional pathway configuration at the interface between an integrated circuit (IC) radio frequency (RF) digital device and the circuit assembly with which the IC RF digital device is provided. In a further embodiment, a functional pathway configuration at the interface between one or more semiconductor dice including a digital device and radio frequency device and the circuitry of a system including the one or more semiconductor dice is provided.

In accordance with the present invention, in one embodiment a system including the IC RF digital device may, advantageously, comprise a digital device having a plurality of digital inputs and outputs, a clock input, a serial data output, one or more analog inputs, one or more analog outputs, and is intended for connection to power ($V_{DD}$) and ground ($V_{SS}$). The digital device may be for example, but not limited to, microcontroller, microprocessor, programmable logic array (PLA), application specific integrated circuit (ASIC), digital code hopping encoder, decoder and/or encoder-decoder.

In one aspect, the present invention comprises an integrated circuit (IC) radio frequency (RF) digital device including a plurality of connections or "pins." Advantageously, at least one pin comprises a power connection, at least one pin comprises a ground connection, and the remaining pins are input, output or input/output (I/O) connections, wherein each pin may have one or more associated functions. The pins may be analog, digital, mixed-signal (can be analog or digital). Some pins advantageously may be multiplexed with one or more alternate functions for the peripheral features on the IC radio frequency microcontroller so that in general when a function is enabled that particular pin may not be used, for example, as a general purpose I/O pin. Separate pins for radio frequency signals, power and ground for the radio frequency device may be used in the present invention.

In one embodiment, an integrated circuit (IC) in accordance with the present invention advantageously includes 18 or 20 connections or pins. Each pin may be adapted and described according to the function(s) dedicated to the connection, so that all or a portion of the connections together define a functional pathway configuration at the interface between the IC radio frequency microcontroller and the system in which the IC radio frequency microcontroller may be embedded. Alternately, in another embodiment, the present invention comprises a system for receiving transmissions from such an IC.

In accordance with the present invention, and depending upon the particular application involved, the integrated circuit, with which a system interfaces, may comprise a packaged IC. Examples of types of packaging include a dual in-line package (DIP), which may comprise molded plastic dual in-line package (PDIP) or ceramic dual in-line package (CERDIP); micro lead frame (MLF); pin grid arrays (PGAs); ball grid arrays (BGAs); quad packages; thin packages, such as flat packs (FPs), thin small outline packages (TSOPs), shrink small outline package (SSOP), small outline IC (SOIC) or ultrathin packages (UTPs); lead on chip (LOC) packages; chip on board (COB) packages, in which the chip is bonded directly to a printed-circuit board (PCB); and others. However, for the sake of clarity and convenience only, and without limitation as to the scope of the present invention, reference will be made herein primarily to SOIC and SSOP ICs.

Table 1 describes an exemplary embodiment including the various functions that the IC RF digital device may perform, with the functions arranged by pin dedication. Of course the exact pin and function names used in any particular embodiment or application may vary depending upon the naming convention(s) selected. The embodiment described in Table 1 in general may be suited for applications requiring a wireless RF digital device in an 18 pin integrated circuit package.

TABLE 1

| PIN NO./NAME | Input/Output/ Power | BUFFER TYPE | DESCRIPTION |
| --- | --- | --- | --- |
| 1. $V_{DD}$ | Power | N/A | Positive supply for logic and I/O pins, 2.5 to 5.5 volts. |
| 2. GP5/OSC1/CLKIN | Input/Output | TTL/ST | Bi-directional I/O port/oscillator crystal input/external clock input. |
| 3. GP4/OSC2 | Input/Output | TTL | Bi-directional I/O port/oscillator crystal output. |
| 4. GP3/~MCLR/$V_{PP}$ | Input | TTL/ST | Input port/master clear (reset) input/ programming voltage input. |
| 5. $RFEN_{IN}$ | Input | CMOS | Dual enable for clock buffer and RF (no hysteresis). |
| 6. CLKOUT | Output | CMOS | Crystal Frequency divided by N, e.g., four. |
| 7. PS/DATA$_{ASK}$ | Input | CMOS | Power Select and ASK input. |
| 8. $V_{DDRF}$ | Power | N/A | Radio frequency device power. |
| 9. ANT2 | Output | NPN Collector | Antenna output2. |
| 10. ANT1 | Output | NPN Collector | Antenna output1 |
| 11. $V_{SSRF}$ | Power | N/A | Radio frequency device ground |
| 12. No Connection | N/A | N/A | |
| 13. LF (Loop Filter) | Output | N/A | Common node of charge pump output and VCO steering input, external loop filter connection. |

TABLE 1-continued

| PIN NO./NAME | Input/Output/ Power | BUFFER TYPE | DESCRIPTION |
| --- | --- | --- | --- |
| 14. XTAL (Xtal OSC) | Input | Xtal OSC base | Crystal oscillator connection. |
| 15. GP2/TOCKI | Input/Output | ST | Bi-directional I/O port. Can be configured as TOCKI. |
| 16. GP1 | Input/Output | TTL/ST | Bi-directional I/O port/serial programming clock. |
| 17. GP0 | Input/Output | TTL/ST | Bi-directional I/O port/serial programming data. |
| 18. $V_{SS}$ | Power | N/A | Digital logic and I/O pins ground |

Legend: TTL=TTL compatible input; I=input; P=power; ST=Schmitt trigger input with CMOS levels; O=output.

Table 2 describes an exemplary embodiment including the various functions that the IC RF digital device may perform, with the functions arranged by pin dedication. Of course the exact pin and function names used in any particular embodiment or application may vary depending upon the naming convention(s) selected. The embodiment described in Table 2 in general may be suited for applications requiring a wireless RF digital device in a 20 pin integrated circuit package.

TABLE 2

| PIN NO./NAME | Input/Output/ Power | BUFFER TYPE | DESCRIPTION |
| --- | --- | --- | --- |
| 1. $V_{DD}$ | Power | N/A | Positive supply for logic and I/O pins, 2.5 to 5.5 volts. |
| 2. GP5/OSC1/CLKIN | Input/Output | TTL/ST | Bi-directional I/O port/oscillator crystal input/external clock input. |
| 3. GP4/OSC2 | Input/Output | TTL | Bi-directional I/O port/oscillator crystal output. |
| 4. GP3/~MCLR/$V_{PP}$ | Input | TTL/ST | Input port/master clear (reset) input/ programming voltage input. |
| 5. XTAL (Xtal OSC) | Input | Xtal OSC base | Crystal oscillator connection. |
| 6. $RFEN_{IN}$ | Input | CMOS | Dual enable for clock buffer and RF (no hysteresis). |
| 7. CLKOUT | Output | CMOS | Crystal Frequency divided by N, e.g., four. |
| 8. PS/$DATA_{ASK}$ | Input | CMOS | Power Select and ASK input. |
| 9. $V_{DDRF}$ | Power | N/A | Radio frequency device power. |
| 10. ANT2 | Output | NPN Collector | Antenna output2. |
| 11. ANT1 | Output | NPN Collector | Antenna output1 |
| 12. $V_{SSRF}$ | Power | N/A | Radio frequency device ground |
| 13. No Connection | N/A | N/A | |
| 14. LF (Loop Filter) | Output | N/A | Common node of charge pump output and VCO steering input, external loop filter connection. |
| 15. $DATA_{FSK}$ | Input | CMOS | Analog switch control input that switches capacitor on/off in xtal osc. circuit for FSK. |
| 16. $FSK_{OUT}$ | Output | CMOS switch out | Connects to FSK capacitor, switches capacitor to ground. |
| 17. GP2/TOCKI | Input/Output | ST | Bi-directional I/O port. Can be configured as TOCKI. |
| 18. GP1 | Input/Output | TTL/ST | Bi-directional I/O port/serial programming clock. |
| 19. GP0 | Input/Output | TTL/ST | Bi-directional I/O port/serial programming data. |
| 20. $V_{SS}$ | Power | N/A | Digital logic and I/O pins ground |

Legend: TTL=TTL compatible input; I=input; P=power; ST=Schmitt trigger input with CMOS levels; O=output.

Each of the pins advantageously is adapted with circuitry for a wireless RF digital device whose configuration may be programmable (e.g., storage registers, microcontrollers, microprocessors, application specific integrated circuits (ASIC), programmable gate arrays (PGA), digital code hopping encoder decoder and/or encoder-decoder, phase-locked-loop, frequency divider and other devices and/or combinations thereof) is programmed with firmware, to be dedicated to the functions as listed in Tables 1 and 2. Of course the exact form of the circuitry and/or firmware used to create such functionality and adapt such pins may vary depending upon the particular application involved. Without limitation as to the scope of the present invention, for the sake of clarity and convenience reference will be made herein to a firmware embodiment of the present invention.

BRIEF DESCRIPTION OF THE DRAWINGS

Further objects and advantages of the present invention will become apparent upon reading the following detailed description and upon referring to the accompanying drawings in which.

Figures 1A, 1B:
FIGS. 1a and 1b are diagrams illustrating exemplary embodiments of 18-pin and 20-pin IC wireless RF digital devices, respectively, including a functional pathway configuration for the interface between the IC wireless RF digital device and a system in which it is embedded, in accordance with the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The description below illustrates embodiments of the present invention. For the sake of clarity, not all features of an actual implementation of the present invention are described in this specification. It should be appreciated that in connection with developing any actual embodiment of the present invention many application-specific decisions must be made to achieve specific goals, which may vary from one application to another. Further, it should be appreciated that any such development effort might be complex and time-consuming, but would still be routine for those of ordinary skill in the art having the benefit of this disclosure.

For the sake of clarity and convenience, aspects of the present invention are described in the context of various embodiments typically used in applications generally involving an IC radio frequency microcontrollers, examples of which are set forth herein.

Figure 2:
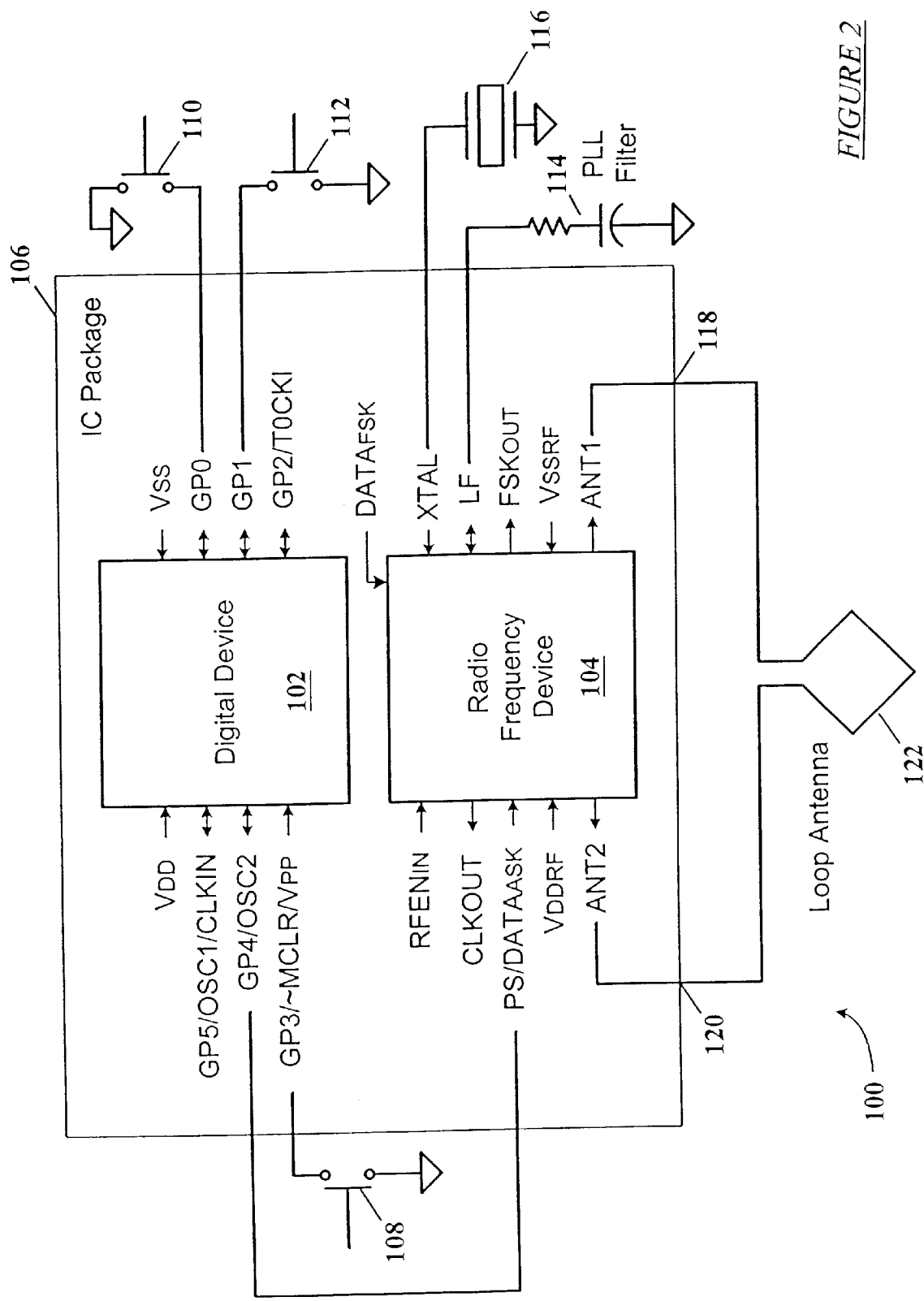
FIG. 2 is a functional block diagram illustrating an exemplary embodiment of the C wireless RF digital devices illustrated in FIGS. 1a and 1b, in accordance with the present invention.

Turning now to the drawings, and by way of general illustration, as shown in FIGS. 2a and 2b, exemplary embodiments in accordance with the present invention comprise a plastic small outline integrated circuit (SOIC) or a shrink small outline package (SSOP) 18-pin and 20-pin, respectively, IC wireless RF digital devices having functional pathway configurations for interfacing between the IC wireless RF digital devices and systems in which the IC wireless RF digital devices are embedded. A functional block diagram of the IC wireless RF digital devices is illustrated in FIG. 2.

As depicted in FIGS. 2a, 2b and 1, the IC wireless RF digital device is in general functionally configured with a plurality of bi-directional input-outputs (I/O), some or all of which may be capable of multiple functions, e.g., reset, clock buffer, crystal oscillator, crystal frequency output, serial programming data input and serial data clock. In addition, pin connections for phase-locked-loop filter, antenna outputs, power select, data modulation input, and separately paired power and ground connects for the microcontroller and radio frequency device. The connection pins associated with the digital device, preferably, are grouped together on both sides of a vertical axis along a length of a portion of the package (as opposed to across the package). Likewise, the connection pins associated with the radio frequency device, preferably, are grouped together on both sides of the vertical axis along the length of the remaining portion of the package. A configuration including such a feature advantageously increases the ability to simplify routing for system board design and integrated circuit wireless radio frequency digital device placement thereon. Such advantage may prove beneficial in some cases, e.g., to an applications engineer in situations where partitioning of the printed circuit board in which the wireless RF digital device is to be mounted would prove to be advantageous. In the embodiment shown, the locations of the ANT1 and ANT2 pins are at one end of the IC package and are symmetrically placed to enable convenient placement of an antenna, and equal loading of the differential amplifier output circuits, e.g., a loop antenna on the product printed circuit board. The ground or common power supply pins, VSS and VSSRF are grouped on one side of the IC package. The power supply pins, VDD and VDDRF are grouped on the other side of the IC package. Further, as illustrated in FIGS. 1 and 2, the pins associated with the radio frequency device are grouped together and the pins associated with the microcontroller are advantageously grouped together for simplification of board layout and signal integrity.

The GP5/OSC1/CLKIN functional pathway is adapted for coupling as a bi-directional I/O port, oscillator crystal input or external clock input of the system. The GP4/OSC2 functional pathway is adapted for coupling as a bi-directional I/O port or oscillator crystal output. The GP3/~MCLR/NVPP functional pathway is adapted for coupling as an input port, master clear (reset) input or programming voltage input. The RFENIN functional pathway is adapted for coupling as a dual enable for clock buffer (CLKOUT) and R.F. activation. The CLKOUT functional pathway is adapted for coupling as a crystal frequency divided by N, e.g., four. The PS/DATAASK functional pathway is adapted for coupling as a power select and amplitude shift keying (ASK) data input. The ANT1 and ANT2 functional pathways are adapted for coupling to either a single ended or differential antenna. The LF (Loop Filter) functional pathway is adapted for coupling to a common node of charge pump output and VCO steering input. This pathway is an external loop filter connection. The XTAL (Xtal OSC) functional pathway is adapted for coupling as an external crystal connection. The GP2/T0CKI functional pathway is adapted for coupling as a bi-directional I/O port, or may be configured as TOCKI. The GPO functional pathway is adapted for coupling as a bi-directional I/O port or serial programming data. The GP1 functional pathway is adapted for coupling as a bi-directional I/O port or serial programming clock. The DATAFSK functional pathway is adapted as a control input for a switch that switches a capacitor in and out of the XTAL oscillator circuit for frequency shift keying (FSK) operation. The FSKOUT functional pathway is adapted to connect to the FSK capacitor and switches it in and out of the XTAL oscillator circuit so as to change the frequency of the crystal oscillator.

The VDD and VSS functional pathways are adapted for coupling to power supply voltages required for operation of the microcontroller in the system. The VDDRF and VSSRF functional pathways are adapted for coupling to power supply voltages required for operation of the radio frequency device in the system. The NC functional pathways are spare and may be used for future enhancements, functional definitions, etc. to the present invention.

In accordance with the present invention, and depending upon the particular application involved, the integrated circuit, with which a system interfaces, may comprise a packaged IC. Examples of types of packaging include a dual in-line package (DIP), which may comprise molded plastic dual in-line package (PDIP) or ceramic dual in-line package (CERDIP); micro lead frame (MLF); pin grid arrays (PGAs); ball grid arrays (BGAs); quad packages; thin packages, such as flat packs (FPs), thin small outline packages (TSOPs), shrink small outline package (SSOP), small outline IC (SOIC) or ultrathin packages (UTPs); lead on chip (LOC) packages; chip on board (COB) packages, in which the chip is bonded directly to a printed-circuit board (PCB); and others. However, for the sake of clarity and convenience only, and without limitation as to the scope of the present invention, reference will be made herein primarily to SOIC and SSOP ICs.

The digital device may be for example, but not limited to, a microcontroller, a microprocessor, a programmable logic array (PLA), an application specific integrated circuit (ASIC); or a digital code hopping encoder, decoder or encoder-decoder.

The present invention has been described in terms of exemplary embodiments. In accordance with the present invention, the parameters for a system may be varied, typically with a design engineer specifying and selecting them for the desired application. Further, it is contemplated that other embodiments, which may be devised readily by persons of ordinary skill in the art based on the teachings set forth herein, may be within the scope of the invention, which is defined by the appended claims. The present invention may be modified and practiced in different but equivalent manners that will be apparent to those skilled in the art having the benefit of the teachings set forth herein.

No limitations are intended to the details or construction or design shown herein, other than as described in the claims appended hereto. Thus, it should be clear that the specific embodiments disclosed above may be altered and modified, and that all such variations and modifications are within the spirit and scope of the present invention as set forth in the claims appended hereto.

What is claimed is:

1. An integrated circuit (IC) functional pathway configuration having connections comprising: $V_{DD}$, GP5/OSC1/CLKIN, GP4/OSC2, GP3/~MCLR/$V_{PP}$, $RFEN_{IN}$, CLKOUT, PS/$DATA_{ASK}$, $V_{DDRF}$, ANT2, ANT1, $V_{SSRF}$, LF, XTAL, GP2/T0CKI, GP1, GP0 and $V_{SS}$.

2. The IC functional pathway configuration according to claim 1, wherein the connections are arranged as follows:

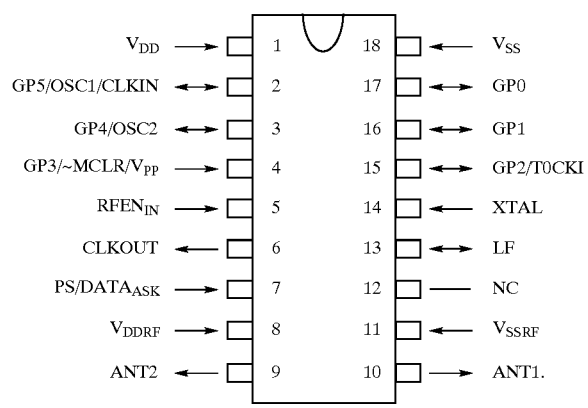

3. The IC functional pathway configuration according to claim 1, further having connections comprising: $DATA_{FSK}$ and $FSK_{OUT}$.

4. The IC functional pathway configuration according to claim 3, wherein the connections are arranged as follows:

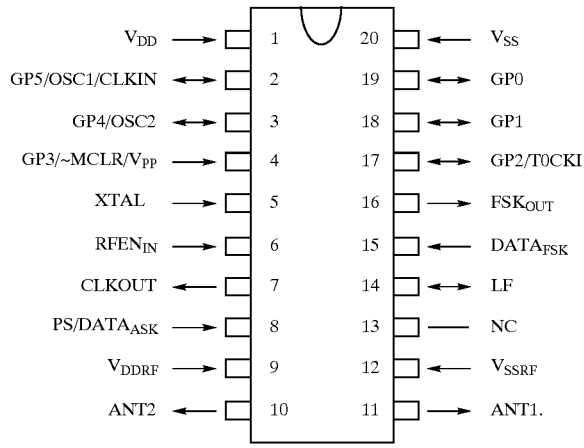

5. A functional pathway configuration for a wireless radio frequency (RF) digital device, comprising:
   a plurality of bi-directional (GP0–GP5) function input-outputs;
   a clock buffer and RF enable ($RFEN_{IN}$) function input;
   a crystal frequency divided by N (CLKOUT) output;
   a power select and amplitude shift keying (PS/$DATA_{ASK}$) function input;
   a differential antenna (ANT1 and ANT2) function outputS; and
   a loop filter (LF) function input-output;
   a crystal (XTAL) function input.

6. The functional pathway configuration according to claim 5, wherein one of the plurality of bi-directional (GP0–GP5) function input-outputs may be programmed as an oscillator crystal (OSC1) function input.

7. The functional pathway configuration according to claim 5, wherein one of the plurality of bi-directional (GP0–GP5) function input-outputs may be programmed as an external clock (CLKIN) function input.

8. The functional pathway configuration according to claim 5, wherein one of the plurality of bi-directional (GP0–GP5) function input-outputs may be programmed as an oscillator crystal (OSC2) function output.

9. The functional pathway configuration according to claim 5, wherein one of the plurality of bi-directional (GP0–GP5) function input-outputs may be programmed as a master clear (reset) (~MCLR) function input.

10. The functional pathway configuration according to claim 5, wherein one of the plurality of bi-directional (GP0–GP5) function input-outputs may be programmed as a programming voltage ($V_{PP}$) function input.

11. The functional pathway configuration according to claim 5, wherein one of the plurality of bi-directional (GP0–GP5) function input-outputs may be programmed as a (T0CKI) function input.

12. The functional pathway configuration according to claim 5, wherein one of the plurality of bi-directional (GP0–GP5) function input-outputs may be programmed as a serial programming clock function input.

13. The functional pathway configuration according to claim 5, wherein one of the plurality of bi-directional (GP0–GP5) function input-outputs may be programmed as a serial programming data function input.

14. The functional pathway configuration according to claim 5, further comprising a frequency shift keying switch output (FSK$_{OUT}$) adapted for connection to a capacitor for shifting the frequency of an oscillator and a frequency shift keying control input (DATA$_{FSK}$) for controlling the FSK-OUT output.

15. A functional pathway configuration for a digital device and a radio frequency device as follows:

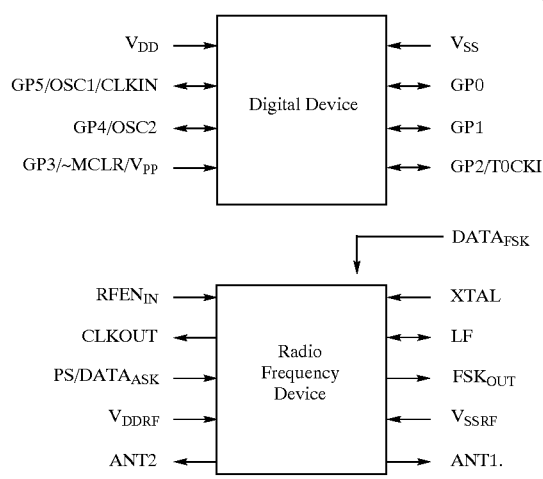

16. The functional pathway configuration according to claim 15, wherein pathway configuration function connections are arranged as follows:

| CONNECTION | FUNCTION(S) |
| --- | --- |
| P1 | V$_{DD}$ |
| P2 | GP5/OSC1/CLKIN |
| P3 | GP4/OSC2 |
| P4 | GP3/~MCLR/V$_{PP}$ |
| P5 | RFEN$_{IN}$ |
| P6 | CLKOUT |
| P7 | PS/DATA$_{ASK}$ |
| P8 | V$_{DDRF}$ |
| P9 | ANT2 |
| P10 | ANT1 |
| P11 | V$_{SSRF}$ |
| P12 | No connection |
| P13 | LF (Loop Filter) |
| P14 | XTAL (Xtal OSC) |
| P15 | GP2/T0CKI |
| P16 | GP1 |
| P17 | GP0 |
| P18 | V$_{SS}$. |

17. The functional pathway configuration according to claim 15, wherein pathway configuration function connections are arranged as follows:

| CONNECTION | FUNCTION(S) |
| --- | --- |
| P1 | V$_{DD}$ |
| P2 | GP5/OSC1/CLKIN |
| P3 | GP4/OSC2 |
| P4 | GP3/~MCLR/V$_{PP}$ |
| P5 | XTAL (Xtal OSC) |
| P6 | RFEN$_{IN}$ |
| P7 | CLKOUT |

| CONNECTION | FUNCTION(S) |
| --- | --- |
| P8 | PS/DATA$_{ASK}$ |
| P9 | V$_{DDRF}$ |
| P10 | ANT2 |
| P11 | ANT1 |
| P12 | V$_{SSRF}$ |
| P13 | No connection |
| P14 | LF (Loop Filter) |
| P15 | DATA$_{FSK}$ |
| P16 | FSK$_{OUT}$ |
| P17 | GP2/T0CKI |
| P18 | GP1 |
| P19 | GP0 |
| P20 | V$_{SS}$. |

18. A functional pathway configuration for a digital device and a radio frequency device, comprising:

a first set of nine connections P1, P2, P3, P4, P5, P6, P7, P8 and P9, wherein each of the first set of nine connections has a dedicated function(s) as follows:

| CONNECTION | FUNCTION(S) |
| --- | --- |
| P1 | V$_{DD}$ |
| P2 | GP5/OSC1/CLKIN |
| P3 | GP4/OSC2 |
| P4 | GP3/~MCLR/V$_{PP}$ |
| P5 | RFEN$_{IN}$ |
| P6 | CLKOUT |
| P7 | PS/DATA$_{ASK}$ |
| P8 | V$_{DDRF}$ |
| P9 | ANT2 | and;

a second set of nine connections P10, P11, P12, P13, P14, P15, P16, P17 and P18, wherein each of the second set of nine connections has a dedicated function(s) as follows:

| CONNECTION | FUNCTION(S) |
| --- | --- |
| P10 | ANT1 |
| P11 | V$_{SSRF}$ |
| P12 | No connection |
| P13 | LF (Loop Filter) |
| P14 | XTAL (Xtal OSC) |
| P15 | GP2/TOCKI |
| P16 | GP1 |
| P17 | GP0 |
| P18 | V$_{SS}$ | wherein at least one of the sets is disposed on one side of an integrated circuit package.

19. A functional pathway configuration for a digital device and a radio frequency device, comprising:

a first set of ten connections P1, P2, P3, P4, P5, P6, P7, P8, P9 and P10, wherein each of the first set of ten connections has a dedicated function(s) as follows:

| CONNECTION | FUNCTION(S) |
| --- | --- |
| P1 | V$_{DD}$ |
| P2 | GP5/OSC1/CLKIN |

-continued

| CONNECTION | FUNCTION(S) |
|---|---|
| P3 | GP4/OSC2 |
| P4 | GP3/~MCLR/$V_{PP}$ |
| P5 | XTAL (Xtal OSC) |
| P6 | $RFEN_{IN}$ |
| P7 | CLKOUT |
| P8 | PS/$DATA_{ASK}$ |
| P9 | $V_{DDRF}$ |
| P10 | ANT2 | and;

a second set of ten connections P11, P12, P13, P14, P15, P16, P17, P18, P19 and P20, wherein each of the second set of ten connections has a dedicated function(s) as follows:

| CONNECTION | FUNCTION(S) |
|---|---|
| P11 | ANT1 |
| P12 | $V_{SSRF}$ |
| P13 | No connection |
| P14 | LF (Loop Filter) |
| P15 | $DATA_{ASK}$ |
| P16 | $FSK_{OUT}$ |
| P17 | GP2/TOCKI |
| P18 | GP1 |
| P19 | GP0 |
| P20 | $V_{SS}$ | wherein at least one of the sets is disposed on one side of an integrated circuit package.

* * * * *